July 10, 1945.   L. C. MARTZ   2,380,118

FOOT REST

Filed June 24, 1943

Inventor
Loyd C. Martz.

By Clarence A. O'Brien
and Harvey B. Jacobson
Attorneys

Patented July 10, 1945

2,380,118

UNITED STATES PATENT OFFICE 2,380,118

FOOTREST

Loyd C. Martz, Del Norte, Colo., assignor of one-half to Lester L. Felker, Del Norte, Colo.

Application June 24, 1943, Serial No. 492,076

1 Claim. (Cl. 155—165)

This invention relates to new and useful improvements and special type of foot rests and more particularly to a foot rest for convenient use in passenger compartments of automobiles and like vehicles.

The principal object of the present invention is to provide an automobile foot rest such as is especially desirable for optional and occasional use during long trips.

Other objects and advantages of the invention will become apparent to the reader of the following description.

Figure 1:
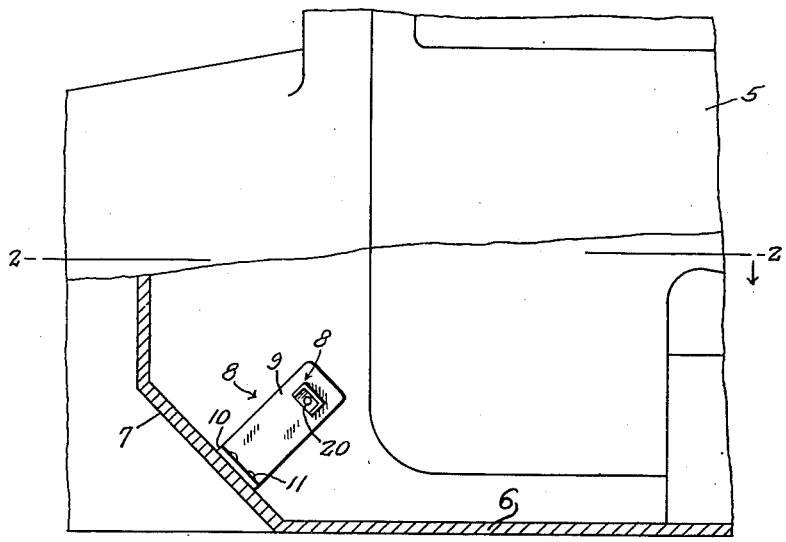
Figure 1 represents a fragmentary vertical sectional view through an automobile body showing one of the rests in side elevation.
Figure 2:
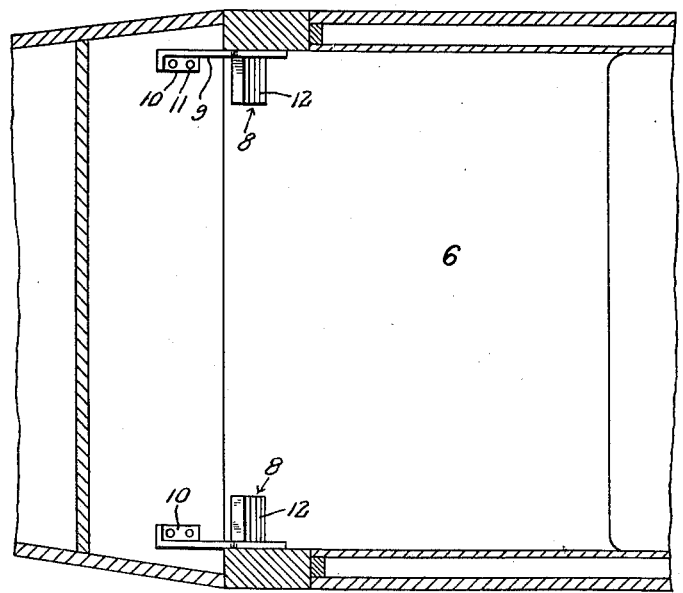
Figure 2 is a horizontal section on the line 2—2 of Figure 1.

Referring to the drawing wherein like numerals designate like parts, it can be seen that numeral 5 denotes an automobile body which has a floor 6 and a toe board 7. The foot rest, generally denoted by the numeral 8, is preferably, but not necessarily, mounted on the toe-board.

The present invention comprises a bracket or stand having an upright 9 provided at its lower end with a lateral flange defining an anchoring foot 10. This so-called anchoring foot is adapted to be secured either to the floor or toe-board 7, being preferably secured to the latter, this by way of suitable fastenings 11.

Figure 3:
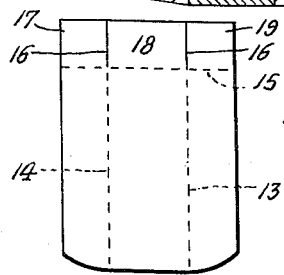
Figure 3 is a plan view of the blank from which the rest element is formed.

Numeral 12 denotes a rest element which projects laterally from the upper portion of the bracket 9 and this element consists of a sheet of material, as shown in Figure 3, folded on lines 13, 14 and 15 and slit on lines 16, 16. The slits 16, 16 define flaps 17, 18 and 19 which are overlapped as is apparent in Figure 1, and these overlapped flaps can be formed with an opening through which a suitable securing element 20 is disposed for securing the rest element 12 to the bracket 9.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An automobile accessory type foot rest comprising a stand, said stand embodying an upright having a laterally directed anchoring foot at its lower end attachable to a relatively fixed part of an automobile, and a foot rest, said foot rest being channeled in cross-section and including parallel flanges along longitudinal edges and overlapping ears at the end adjacent said upright, said ears being fastened to said upright, said foot rest being attached to said upright at a point below the upper end thereof, thus permitting the upstanding portion to function as an anti-slipping guard.

LOYD C. MARTZ.